Figure 1:
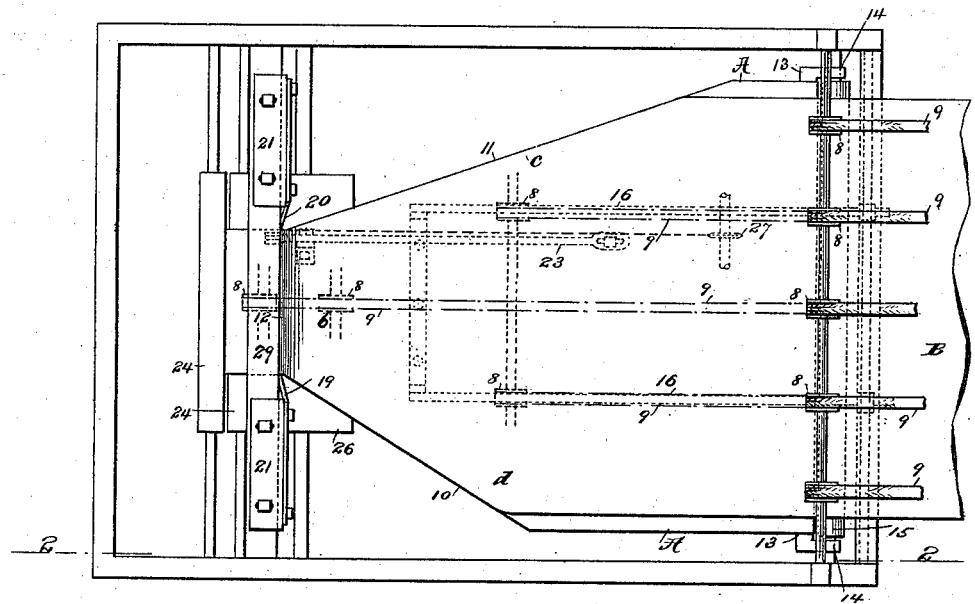

(Model.)

9 Sheets—Sheet 1.

L. C. CROWELL.
FOLDING MACHINE.

No. 383,798. Patented May 29, 1888.

(Model.)

9 Sheets—Sheet 2.

L. C. CROWELL.
FOLDING MACHINE.

No. 383,798. Patented May 29, 1888.

(Model.)

9 Sheets—Sheet 3.

L. C. CROWELL.
FOLDING MACHINE.

No. 383,798. Patented May 29, 1888.

(Model.)

9 Sheets—Sheet 4.

L. C. CROWELL.
FOLDING MACHINE.

No. 383,798.

Patented May 29, 1888.

Attest:
Geo. H. Botts.
Jas. J. Kennedy.

Inventor:
Luther C. Crowell.
by Philipp, Philipp & Hoey.
Attys.

(Model.)     L. C. CROWELL.     9 Sheets—Sheet 5.

FOLDING MACHINE.

No. 383,798.     Patented May 29, 1888.

(Model.)

9 Sheets—Sheet 6.

L. C. CROWELL.

FOLDING MACHINE.

No. 383,798. Patented May 29, 1888.

Fig. 6.

(Model.)

L. C. CROWELL.
FOLDING MACHINE.

No. 383,798.

9 Sheets—Sheet 7.

Patented May 29, 1888.

(Model.) 9 Sheets—Sheet 8.
L. C. CROWELL.
FOLDING MACHINE.

No. 383,798. Patented May 29, 1888.

(Model.) L. C. CROWELL. 9 Sheets—Sheet 9.
FOLDING MACHINE.

No. 383,798. Patented May 29, 1888.

Attest:
Geo. H. Potts.
Jas. J. Kennedy.

Inventor:
Luther C. Crowell
by Philipp Phelps & Hovey.
Attys.

UNITED STATES PATENT OFFICE.

LUTHER C. CROWELL, OF BROOKLYN, ASSIGNOR TO ROBERT HOE, PETER S. HOE, STEPHEN D. TUCKER, THEODORE H. MEAD, AND CHARLES W. CARPENTER, ALL OF NEW YORK, N. Y.

FOLDING-MACHINE.

SPECIFICATION forming part of Letters Patent No. 383,798, dated May 29, 1888.

Application filed October 13, 1887. Serial No. 252,226. (Model.)

*To all whom it may concern:*

Be it known that I, LUTHER C. CROWELL, a citizen of the United States, residing at Brooklyn, county of Kings, and State of New York, have invented certain new and useful Improvements in Folding-Machines, fully described and represented in the following specification and the accompanying drawings, forming a part of the same.

This invention relates to that general class of folding-machines known as "longitudinal folders," in which the folding is effected by means of one or more external turners which co-operate with internal guides to deflect the edges of the web or sheet, so as to convert it from a distended to a folded condition during its uninterrupted passage through the machine. In these folding-machines the internal guides and external turner or turners are so arranged with relation to each other and to the web or sheet that all parts of the latter, considered widthwise, are caused to travel the same distance, and are so supported as to be maintained taut and subjected to a uniform tension during the folding operation. Folders of this general class are illustrated in United States Letters Patents Nos. 233,996, 233,997, 276,672, 281,619, and 331,280, heretofore granted to me, and need not therefore be particularly described herein. For convenience, the term "web" will be hereinafter used in referring to the material operated upon; but it is of course to be understood that by properly taping the folder detached sheets are readily operated upon. In all of these folders as heretofore constructed the internal guides have been arranged obliquely across the path of the web and in such relation to the other parts that in changing the web from its flat to its folded condition both edges were deflected about ninety degrees, thus making it necessary to turn or deflect the folded web or to place the rolls which received it at right angles to those which delivered the unfolded web to the folder.

In the folder embodying the present invention the internal guide, which acts upon one part of the web, is arranged obliquely across the path of the web, as in the former constructions, while the other internal guide, which acts upon the other part of the web, is arranged at right angles to the path of the web, and the entire deflection necessary to accomplish the folding is given to one part of the web, (that part which passes over the oblique internal guide,) so that after the two parts of the web are brought together and the folding accomplished the web is in position to pass onward between rolls which are arranged parallel with those from which it passed to the folder.

As a full understanding of the invention can be best given by an illustration and a detailed description of a folder constructed according to the invention, all further preliminary description will be omitted and a full description given, reference being had to the accompanying drawings, in which—

Figure 2:
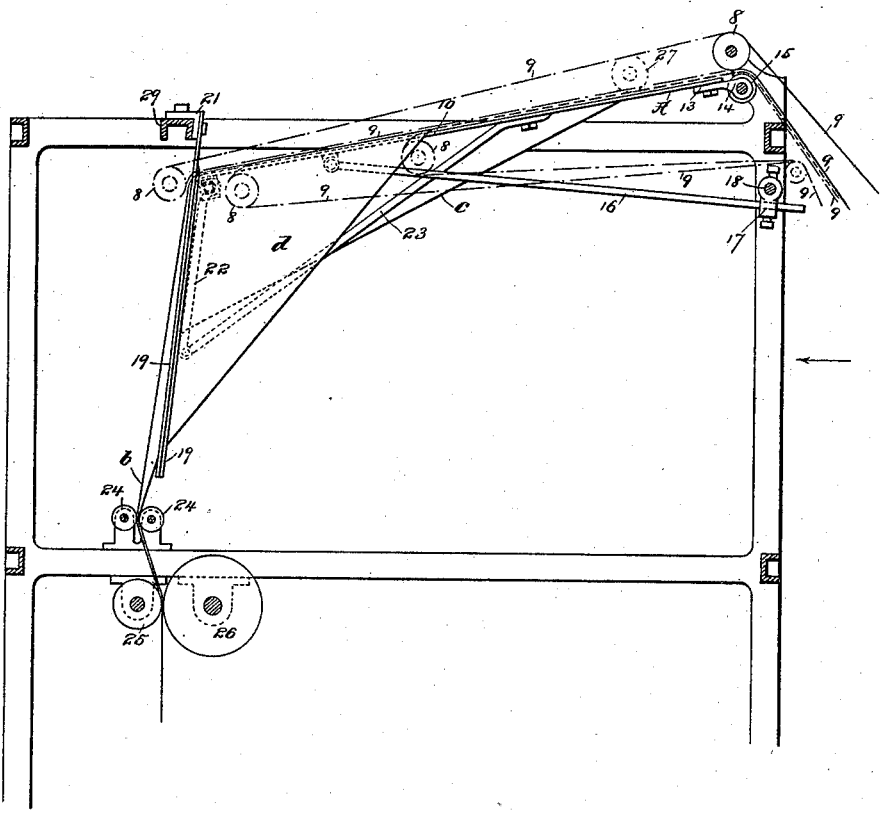
Figure 3:
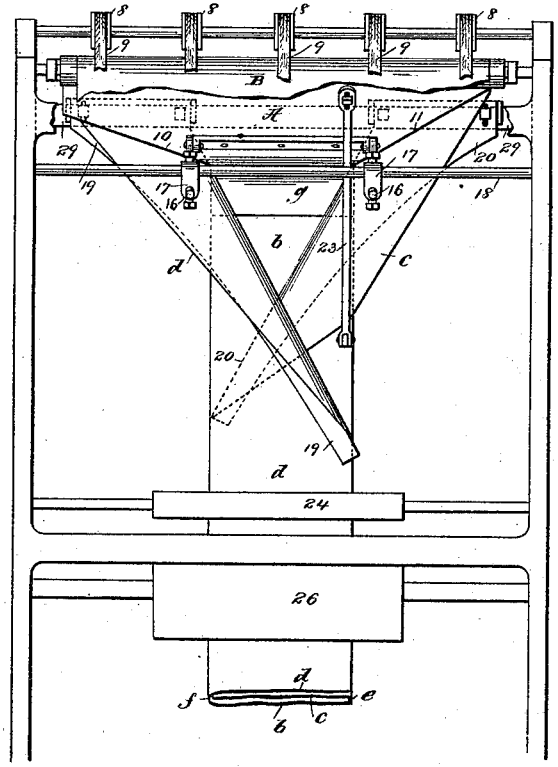
Figure 4:
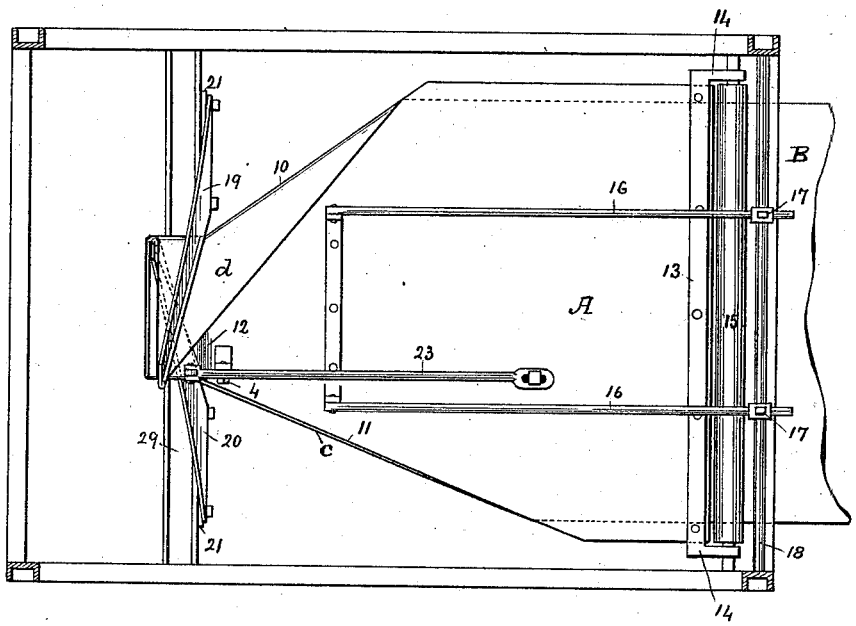
Figure 5:
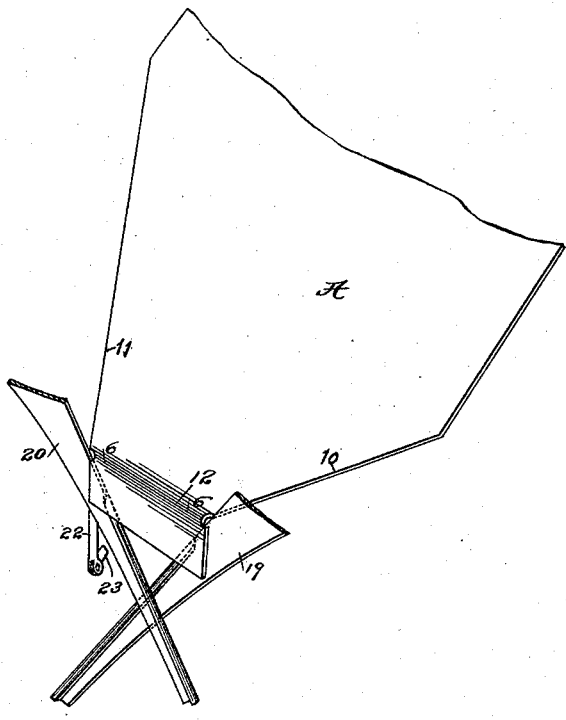
Figure 7:
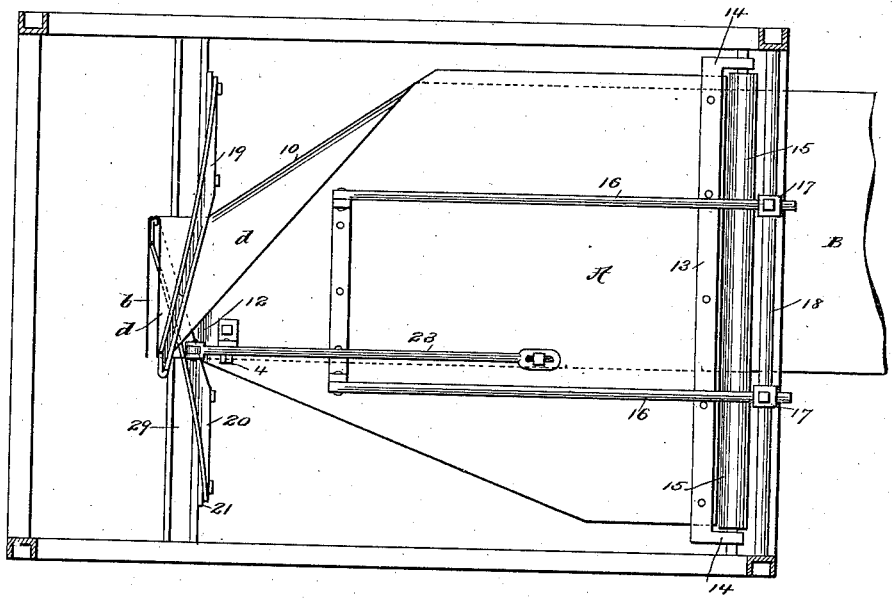
Figure 8:
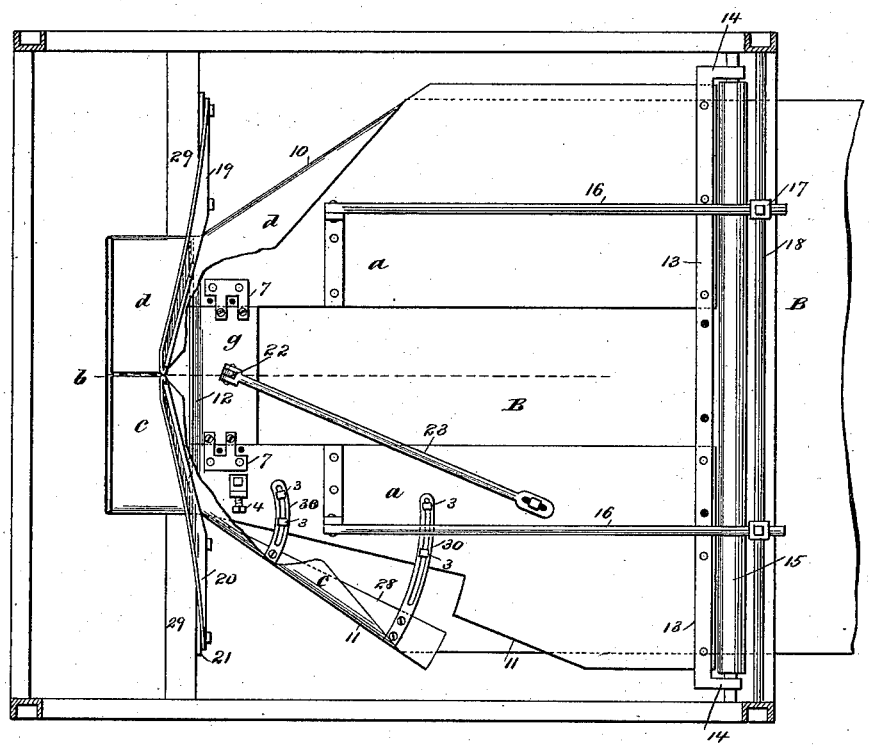
Figure 9:
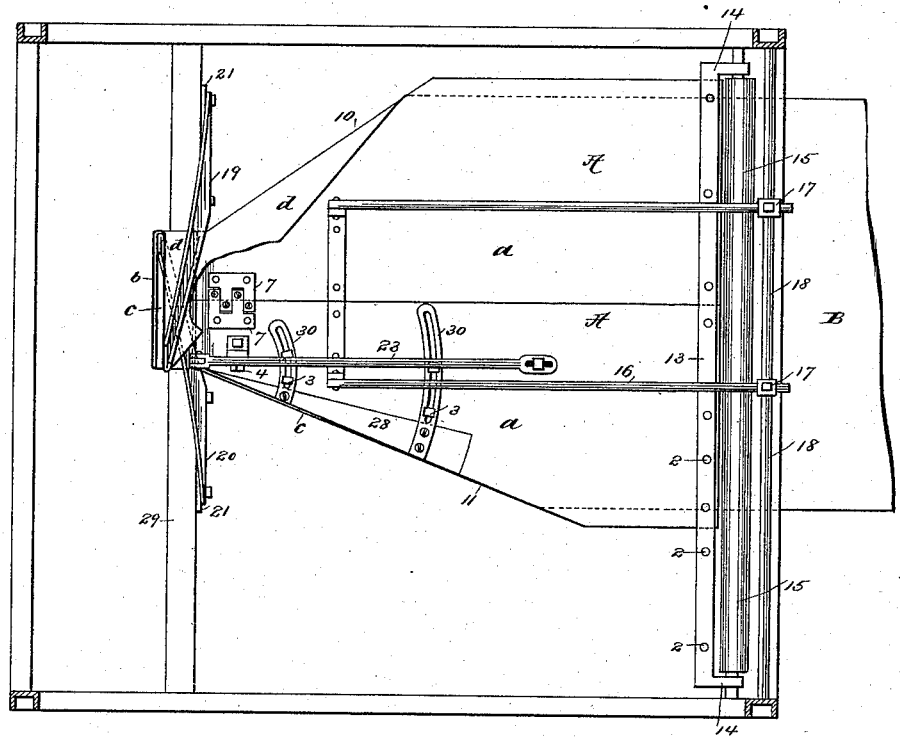
Figure 10:
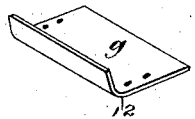

Figure 1 is a plan view of a double folder embodying the invention. Fig. 2 is a sectional elevation of the same, taken upon the line 2 2 of Fig. 1. Fig. 3 is a rear elevation looking from the direction of the arrow shown in Fig. 2. Fig. 4 is a view of the folder, looking from beneath, or what would be a plan view of the folder if inverted. Fig. 5 is a perspective view of the folder with the web removed. Figs. 6 and 7 are views similar to Figs. 1 and 4, illustrating the operation of the folder upon a web of two-thirds width. Fig. 8 is a view similar to Fig. 4, illustrating a double folder for a wider web. Fig. 9 is a similar view, illustrating the operation of this large-size folder upon a two thirds-width web. Fig. 10 is a perspective view of a detail, which will be hereinafter referred to.

Referring now particularly to Figs. 1 to 4, it is to be understood that the folder, as therein illustrated, is a double one—that is to say, is provided with internal guides and external turners, adapting it to impart two longitudinal folds to the web. The folder may, however, be made single, as will be hereinafter explained. The double form will, however, be first described.

The internal member of the folder is composed in the case shown of a plate, A, which is formed to provide three internal guides, 10 11 12. The guide 12 is formed by the forward edge of the plate, which is bent downward slightly, so as to form a curved guiding-edge, which is arranged at right angles to the path of the web, and is of a length equal to the width of the web after it is folded. The other two internal guides, 10 11, extend from the ends of the guide 12 obliquely across the path of the web, and are formed of the inclined edges of the plate A. The plate A, forming the internal member of the folder, is arranged, preferably, in a nearly horizontal position, as shown, and is supported in any suitable manner. In the case shown the base of the plate is attached to a bar, 13, having arms 14, which are supported upon the shaft of a roll, 15, arranged at the base of the plate. The forward end of the plate is supported by means of one or more rods, 16, which are hinged at their forward ends to the under side of the plate and extend rearward, passing through bearings in blocks 17, which are adjustably supported upon a transverse rod, 18. The bearing-blocks 17 are secured in position upon the rod 18 by means of set-screws, and the rods 16 are secured in the bearings in the blocks 17 by similar screws, as shown. By this means the position and inclination of the internal member of the folder can be adjusted to any degree of nicety. The three guides 10 11 12, forming the internal member of the folder, instead of being formed by the edges of a plate, may of course consist of rods or bars arranged in similar position with relation to each other.

The external turners of the folder consist of two bars, 19 20, which are arranged obliquely across the path of the web and in such position that their turning-edges lie adjacent to and nearly but not quite intersect the points of union between the internal guides, 10 12 and 11 12, respectively. The guides 10 11 12 are preferably slightly cut away or recessed at their points of union, as shown at 6, (see Fig. 5,) so that they will be slightly removed from the fold-lines just at the points where the material is bent over the external turners. This it has been found in practice prevents the material from wrinkling and facilitates the formation of smooth folds. These external guides are pivotally supported at their upper ends upon blocks 21, which are adjustably mounted upon a cross-bar, 29, of the frame-work of the machine. By this means the position of the external turners and their angles with relation to the web can be varied within considerable limits, so as to effect the necessary adjustment of the turners. The external turners are arranged in such relation to the internal guides, 10 11, and to the direction taken by the web as it leaves the guide 12, that the side portions of the web which pass over the guides 10 11, being deflected inward and around the turners 19 20, will be caused to travel exactly the same distance as the central portion of the web which passes directly over the guide 12, so that all portions of the web, considered widthwise, will be supported and maintained at a uniform tension.

The folder as thus far described is so organized as to deliver the web folded to three-ply form—that is to say, with the sides or edges overlapping, so as to produce, when combined with a printing-machine, a folio or four-page product with an inset supplement. To enable the folding to be accomplished in this form it is necessary that one side of the web should be deflected or folded over in advance of the other, and to enable this to be done the guides 10 11 are arranged at different angles, the guide 11 being more nearly parallel with the course of the web, so as to permit the side of the web passing over that guide to be deflected inward more abruptly. To aid in this more abrupt deflection, and to support and maintain the proper tension upon the web between the guide 11 and the turner 20, there is provided a supplemental internal guide, 22, which is hinged to the under side of the plate A at the end of the guide 12, and extends downward parallel with the central portion of the web after it passes the guide 12, and is supported at its outer end by a rod, 23, which extends forward and downward from the under side of the plate A. This supplemental guide 22 is so arranged that the side portion of the web which passes over the guide 11 being conducted around this guide 22 and thence around the turner 20 will be caused to travel exactly the same distance as the other side of the web which passes over the guide 10 and around the turner 19, and will thus be held at the same tension.

The operation of the folder as thus far described is as follows: In describing this operation it will be first assumed that it is desired to impart two parallel longitudinal folds to the web, so as to produce a three-ply product. In this case a web, B, equal to the full capacity of the folder will be used. This web will be led to and over the roll 15 at the base of the plate A, and will pass thence onto the plate and be deflected downward over the internal guides, 10 11 12, as indicated in Fig. 1. To prevent the web from moving laterally upon the folder, and also to advance it properly to and over the folder, tapes, as 9, may be employed, which tapes, running from any previous mechanism, may pass around the roll 15 and pulleys 8, mounted upon a shaft located above or slightly in advance of the shaft of the roll 15. Some of the tapes 9, instead of returning around the roll 15 and the pulleys 8, may pass forward and return around pulleys located as indicated by dotted lines. In some cases the under tapes may be omitted. The central portion, $h$, of the web will, after passing over the guide or guiding-edge 12, be led directly between suitable feed-rolls, as 24. The side portion $c$, which passes around the guide or guiding-edge 11, will be deflected downward and pass around the auxilliary internal guide, 22. After passing this guide, the side portion $c$ will be still further deflected, so as to pass around the external turner, 20, which turner will operate to lay that portion of the web over onto the central portion $b$, thus effecting a longitudinal fold, as indicated at $e$. The other side portion, $d$, of the web, which passes around the guide or guiding-edge 10, will be deflected downward and inward and pass directly around the turner 19, so as to be laid over onto the portion c, thus folding the web longitudinally, as indicated at f, and producing a three-ply product, as shown. The web, thus folded twice longitudinally and reduced to three-ply form, may then be operated upon by any suitable transverse cutting, or cutting and folding, or cutting, folding, and associating mechanisms, as indicated by the cylinders 25 26.

The folder thus constructed and operated is especially adapted for making the longitudinal folds necessary to produce a folio or four-page paper with an inset supplement composed of a half-sheet, or two pages. When this product is to be produced, the web will preferably be slit by a slitter, as 27, arranged at any suitable point, as shown by dotted lines, so that the inset portion c will in the delivered product be detached at its outer edge from the portion b; or, if preferred, the slitter may be arranged to slit the web on the fold-line f, in which case the supplement sheet will be on the outside instead of inset.

If, instead of imparting two longitudinal folds to the web, it should be desired to impart only one longitudinal fold, a web of only two-thirds the full width will be used, and this web will be led to the folder the same as before. One side portion of the web, which in this case will correspond to the central portion b, will be led over the guide or guiding-edge 12, while the other side portion corresponding to the portion d will be deflected over the guide or guiding-edge 10 and led around the turner 19, so as to be laid over onto the portion b, as illustrated in Figs. 6 and 7. In this case the guide or guiding-edge 11, the supplemental guide 22, and the turner 20 will be idle If it is not desired to capacitate the folder to impart the two longitudinal folds, then of course the parts which are idle in the case just described may be entirely omitted, and with such parts omitted the folder will embody the invention in its simplest form.

As thus far described and illustrated, the invention is embodied in a folder which is capacitated to deliver the product in suitable form for a folio or four-page product, or for such product with an inset supplement. It may, however, in some cases be desirable to construct the folder in such form that the web, when folded twice longitudinally, will be delivered in condition to form duplicate side-by-side streams of folio products. An organization of the invention suitable for accomplishing this purpose is illustrated in Figs. 8 and 9. In this case the guides or guiding-edges 10 11 are set at the same angle, so that the side portions c d of the web, instead of being overlapped, will be folded over onto the central portion b, so that their edges will meet or substantially meet at the center of the portion b. By then slitting the web centrally, as indicated by the dotted line, two side-by-side streams of folio products can be produced. With the folder thus organized it may sometimes be desirable to produce the product illustrated in Figs. 1 to 4—that is to say, the folio product with the inset supplement. To capacitate the machine to produce this result, the plate A or the guide 12 is made in parts, the side portions a being adjustable to and from each other and the central portion g removable. The turner 19 is made correspondingly adjustable, and the guide or guiding-edge 11 is made capable of being adjusted to different angles with relation to the web. When it is desired to deliver the web folded to the form shown in Figs. 1 to 4, the central portion g will be removed. The two parts a of the plate A or the guides 10 11 will be adjusted together and secured in that position. The guide or guiding-edge 11 will be adjusted to a position to correspond with the guide or guiding-edge 10 in Figs. 1 to 4, and the turner 20 adjusted to a corresponding position, all as shown in Fig. 9. A web of three-fourths-full width will be used and the operation will be the same as first described. When, however, it is desired to deliver the web in condition to produce side-by-side streams of folio products, the two parts of the plate A will be separated, for which purpose extra bolt-holes, 2, are provided in the bar 13, to permit one part of the plate to be moved outward, and the supplemental piece g will be inserted between the two parts of the plate A to continue the guide or guiding-edge 12. The turner 20 will be shifted outward on the bar 29 to a corresponding position. The guide or guiding-edge 11 will be adjusted to the same angle with relation to the web as the guide or guiding-edge 10, and the auxiliary guide 22 will be detached from the plate A at its inner end, and said guide and its supporting-rod will be swung to one side, so as to be out of the way of the web, all as indicated in Fig. 8. A full-width web will be used, and the two side portions c d of the web passing over the guides or guiding-edges 10 11, will be deflected inward by the turners 19 20, so that their edges will meet or substantially meet at the middle of the portion b. By then slitting the web longitudinally at its center, as indicated by the dotted line, two side-by-side streams of folio products can be produced.

To permit of the adjustment of the turner 20, the bar 29 may be provided with extra bolt-holes to receive the bolts which attach the block 21. To provide for the easy adjustment of the guide or guiding-edge 11, the guide is formed on a small triangular portion, 28, of the plate A, which is connected to the main part of the plate by curved slotted arms 30, through which pass bolts 3. By this means the guide 11 can readily be adjusted to any desired angle. The end of the guide 22 is secured to the plate A by means of a bolt, 4, which passes through an eye in the end of the guide. By removing the bolt 4 the guide can readily be disconnected, so as to be swung to one side, as shown in Fig. 8. The two parts a of the plate A are connected at their forward ends by tie-plates 7, which fit into each other, as shown in Fig. 9, and these plates also provide a convenient means for securing the central portion g in position, as shown in Fig. 8.

The gearing for driving the rolls 24 and the cylinders 25 26 is omitted in the drawings, as such gearing can readily be supplied by any skillful mechanic.

What I claim is—

1. In a longitudinal folder, the combination, with an internal guide arranged across one part of the web obliquely to the travel thereof, of an internal guide arranged across the other part of the web at right angles to the travel thereof, and an external turner extending from a point adjacent to the junction of the internal guides, and arranged to deflect the part of the web passing over the oblique guide and lay it over onto the part passing over the other guide, substantially as described.

2. In a longitudinal folder, the combination, with internal guides arranged across the side portions of the web obliquely to the travel thereof, of an internal guide arranged across the central portion of the web at right angles to the travel thereof, and external turners extending from points adjacent to the junctions of the internal guides, and arranged to deflect the portions of the web passing over the oblique guides and lay them over onto the portion passing over the other guide, substantially as described.

3. In a longitudinal folder, the combination, with internal guides arranged across the side portions of the web obliquely to the travel thereof, of an internal guide arranged across the central portion of the web at right angles to the travel thereof, and external turners extending from points adjacent to the junctions of the internal guides, and arranged to deflect the portions of the web passing over the oblique guides and lay them over one upon the other onto the portion passing over the other guide, substantially as described.

4. In a longitudinal folder, the combination, with internal guides arranged across the side portions of the web obliquely to the travel thereof, one of said guides being adjustable to and from the other and to different angles with relation to the web, of an internal guide arranged across the central portion of the web at right angles to the travel thereof, said guide being adjustable in length, and external turners extending from points adjacent to the junctions of the internal guides, and arranged to deflect the portions of the web passing over the oblique guides and lay them over onto the portion passing over the other guide, one of said turners being adjustable to conform to the adjustment of the internal guides, substantially as described.

5. In a longitudinal folder, the combination, with internal guides, 10 11 12, and the auxiliary internal guide, 22, arranged to co-operate with one of said guides, of the external turners, 19 20, substantially as described.

6. In a longitudinal folder, the combination, with internal guides, 10 11 12, and the auxiliary internal guide, 22, of the external turners, 19 20, extending from points adjacent to the junctions of said internal guides, and arranged to deflect the side portions of the web and lay them over one upon the other onto the central portion, substantially as described.

7. In a longitudinal folder, the combination, with internal guides arranged across the side portions of the web obliquely to the travel thereof, one of said guides being adjustable to and from the other and to different angles with relation to the web, of an internal guide arranged across the central portion of the web at right angles to the travel thereof, said guide being adjustable in length, the auxiliary internal guide, 22, and external turners extending from points adjacent to the junctions of the internal guides, and arranged to deflect the portions of the web passing over the oblique guides and lay them over onto the portion passing over the other guide, one of said turners being adjustable to conform to the adjustment of the internal guides, substantially as described.

8. In a longitudinal folder, the combination, with the plate A, made in two parts and forming the internal guides, 10 12, of the removable supplemental section g, substantially as described.

9. In a longitudinal folder, the combination, with the internal guides, 10 12, of the internal guide, 11, made adjustable to different angles with relation to the guides 10 12, substantially as described.

10. In a longitudinal folder, the combination, with an internal guide arranged across one part of the web obliquely to the travel thereof, of an internal guide arranged across the other part of the web at right angles to the travel thereof, and an external turner extending from a point adjacent to the junction of the internal guides, and arranged to deflect the part of the web passing over the oblique guide and lay it over onto the part passing over the other guide, and tapes for conducting the web to and onto the folder, substantially as described.

11. In a longitudinal folder, the combination, with the internal guides, 10 or 11 and 12, recessed or cut away at their point of union, of an external turner, 19 or 20, extending from a point opposite said recess, and arranged to deflect the part of the web passing over one of said internal guides, substantially as described.

In testimony whereof I have hereunto set my hand in the presence of two subscribing witnesses.

LUTHER C. CROWELL.

Witnesses:
J. J. KENNEDY,
T. H. PALMER.